(12) United States Patent
Jung et al.

(10) Patent No.: US 8,476,907 B2
(45) Date of Patent: Jul. 2, 2013

(54) ELECTRONIC DEVICE WITH POWER TESTER

(75) Inventors: Gunok Jung, Yongin-si (KR); Ukrae Cho, Suwon-si (KR); Yongjin Yoon, Seoul (KR); Donggyu Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 625 days.

(21) Appl. No.: 12/759,979

(22) Filed: Apr. 14, 2010

(65) Prior Publication Data

US 2010/0289339 A1 Nov. 18, 2010

(30) Foreign Application Priority Data

May 15, 2009 (KR) .................... 10-2009-0042690

(51) Int. Cl.
 *G01R 31/08* (2006.01)
(52) U.S. Cl.
 USPC ......................................... 324/522; 324/555
(58) Field of Classification Search
 USPC ..... 324/750.3, 763, 158.1, 522, 555; 323/316
 See application file for complete search history.

(56) References Cited

U.S. PATENT DOCUMENTS

| 5,841,271 | A | * | 11/1998 | Nakayama | 323/316 |
| 6,121,786 | A | * | 9/2000 | Yamagami et al. | 324/750.3 |
| 2004/0183559 | A1 | * | 9/2004 | Ware et al. | 324/763 |

FOREIGN PATENT DOCUMENTS

| JP | 2002-214300 | 7/2002 |
| KR | 10-1998-0029008 | 7/1998 |
| KR | 10-1996-0009093 | 3/2006 |
| WO | 2008056206 | 5/2008 |

* cited by examiner

*Primary Examiner* — Vincent Q Nguyen
(74) *Attorney, Agent, or Firm* — F. Chau & Associates, LLC (57) ABSTRACT

An electronic device includes an internal device and a voltage tester. The internal device includes a power supply source input terminal. The voltage tester supplies one of first and second power supply source voltages to the power supply source input terminal of the internal device, in response to a test signal. The first and second power supply source voltages have different voltage levels. The first power supply source voltage has a voltage level within a normal range required for normal operations of the internal device. The second power supply source voltage has an abnormal voltage level outside the normal range.

19 Claims, 5 Drawing Sheets

ELECTRONIC DEVICE WITH POWER TESTER

CROSS-REFERENCE TO RELATED APPLICATIONS

This application claims priority under 35 U.S.C. §119 to Korean Patent Application No. 10-2009-0042690, filed on May 15, 2009, the disclosure of which is incorporated by reference herein.

BACKGROUND

1. Technical Field

Embodiments of the inventive concept relate to an electronic device with a power supply tester.

2. Discussion of Related Art

In electronic devices such as semiconductor memories, central processing units (CPU), interface circuits and communication chips may use an external power supply source voltage. There is an increasing trend to lower the level of the external power supply source voltage to reduce power consumption. However, external power supply source voltages of a low level may not be stably provided.

An external power supply source voltage needs to be stably provided to an electric device to secure the driving and stabile operation of the electronic device. However, an electronic device may not operate in a stable manner when its power supply source voltage is temporarily shifted to a value outside its normal operating range.

Thus, there is a need for an electronic device that can test its operation states when an external power supply source voltage is shifted.

SUMMARY

An exemplary embodiment of the inventive concept includes an electronic device having a power supply source tester that can shift an external power supply source voltage to an abnormal level to supply the changed voltage to internal devices.

An exemplary embodiment of the inventive concept includes an electronic device having an internal device and a voltage tester. The internal device includes a power supply source input terminal. The voltage tester supplies one of first and second power supply source voltages to the power supply source input terminal of the internal device, in response to a test signal. The first and second power supply source voltages have different voltage levels. The first power supply source voltage has a voltage level within a normal range required for normal operations of the internal device. The second power supply source voltage has an abnormal voltage level outside the normal range. The first power supply source voltage may be higher than the second power supply source voltage.

The voltage tester may include a first switch connected between the first power supply source voltage and the power supply source input terminal, a second switch connected between the second power supply source voltage and the power supply source input terminal, and a test circuit outputting first and second switching signals for respectively controlling the first and second switches, in response to the test signal. The first and second switches may be PMOS transistors. In an alternate embodiment, the power supply source input terminal may be a ground voltage input terminal, and the first and second switches may be NMOS transistors.

The voltage tester may include a pulse generator generating a pulse signal in response to the test signal and a driver receiving the pulse signal to output the first and second switching signals. The first and second switching signals may have complementary signal levels, and the driver may generate the first and second switching signals for the first and second switching signals not to overlap.

The electronic device may further include an NMOS transistor connected between the power supply source input terminal and a ground voltage terminal, and the driver may further output a third switching signal for controlling the NMOS transistor in response to the second switching signal.

The pulse generator may include a plurality of delays delaying and outputting the test signal, and having different delay times, and a selection circuit generating the pulse signal in response to any one of the delayed test signals which are outputted from the delays, in response to a plurality of selection signals.

The voltage tester may transition the first switching signal from a low level to a high level and the second switching signal from a high level to a low level when the test signal transitions from a low level to a high level, and the voltage tester may maintain the first switching signal at the high level and the second switching signal at the low level for a period of time after the test signal transitions from the high level to the low level.

An exemplary embodiment of the inventive concept includes an electronic device having an internal device and a tester. The internal device includes a signal input terminal. The tester supplies one of first, second, and third voltages to the signal input terminal of the internal device, in response to a test signal. The first, second, and third voltages have different voltage levels. The first voltage has a signal level for normal operation of the internal device, and the second and third voltages have an abnormal signal level.

The tester may include a first switch connected between the first voltage and the signal input terminal, a second switch connected between the second voltage and the signal input terminal, a third switch connected between the third voltage and the signal input terminal, and a test circuit outputting first, second, and third switching signals for respectively controlling the first, second, and third switches, in response to the test signal.

The first voltage may be higher than the second and third voltages, and the second voltage may be higher than the third voltage. The test circuit may transition the first switching signal from a low level to a high level and the second switching signal from a high level to a low level when the test signal transitions from a low level to a high level. The test circuit may transition the first switching signal from the high level to the low high level and the second switching signal from the low level to the high level after a first period of time elapses. The test circuit may transition the first switching signal from the low level to the high level, the third switching signal from the high level to the low level after a second period of time subsequent to the first period elapses.

An exemplary embodiment of the inventive concept includes an electronic device, having an internal device, a voltage tester, first through third switches. The internal device includes a signal input terminal. The voltage tester supplies one of a first power supply voltage, a second power supply voltage, or a ground voltage to the signal input terminal of the internal device, in response to a test signal. The first switch is connected between the first power supply voltage and the signal input terminal. The second switch is connected between the second power supply voltage and the signal input terminal. The third switch is connected between the ground voltage and the signal input terminal. The first and second power supply voltages have different voltage levels that are higher than the ground voltage, the first power supply voltage is within a normal range required for normal operations of the internal device, and second power supply voltage is outside the normal range.

The voltage tester may include a pulse generator, a non-overlap controller, and a driver. The pulse generator may generate a pulse based on the test signal, a first selection signal, and a second selection signal. The non-overlap controller may output a pair of complementary signals based on the test signal and the pulse. The driver may output first, second, and third switching signals to control the first, second, and third switches, respectively, based on the complementary signals and a third selection signal.

The pulse generator may include a plurality of delays each receiving the test signal and delaying the test signal for a different amount of time, a plurality of inverters each receiving an output of a distinct one of the delays, a plurality of first transmission gates receiving an output of a distinct one of the inverters, and a plurality of second transmission gates. Non-complimentary gate terminals of a first half of the first transmission gates and complimentary gate terminals of the second other half may receive the first selection signal, and non-complimentary gate terminals signals of the first half and complimentary gate terminals of the second half may receive the first selection signal inverted. Each second transmission gate may receive outputs from a distinct pair of the first transmission gates, where each of the gates is from a different one of the halves. A non-complimentary gate terminal of a second transmission gate and a complimentary gate terminal of another second transmission gate may receive the second selection signal and a complimentary gate terminal of the second transmission gate and a non-complimentary gate terminal of the other second transmission gate signal may receive the second selection signal inverted.

The non-overlap controller may include an odd number of first inverters in series, an even number of second inverters in series, a first NAND gate, a second NAND gate, a plurality of third inverters in series, and a plurality of fourth inverters in series. A first one of the first inverters and a first one of the second inverters may receive the pulse. The first NAND gate may receive an output of a last inverter of the first inverters and the second NAND gate may receive an output of a last inverter of the second inverters. A first one of the third inverters may receive an output of the first NAND gate, where the first NAND gate receives an output of a last one of the third inverters. A first one of the fourth inverters may receive an output of the second NAND gate, where the second NAND gate receives an output of a last one of the fourth inverters.

The driver may include a plurality of first inverters in parallel receiving a first one of the complementary signals, a plurality of second inverters in parallel receiving a second other one of the complimentary signals, a NAND gate, and an additional inverter. The first inverters may output the first switching signal and the second inverters may output the second switching signal. The NAND gate may include a first input line and a second other input line, where the first input line receives outputs from the second inverters, and the second input line receives the third selection signal. The additional inverter may receive an output of the NAND gate and output the third switching signal.

BRIEF DESCRIPTION OF THE DRAWINGS

Embodiments of the inventive concept will become readily apparent with reference to the following detailed description when considered in conjunction with the accompanying drawings. In the drawings.

DETAILED DESCRIPTION OF EXEMPLARY EMBODIMENTS

Exemplary embodiments of the inventive concept will be described below in more detail with reference to the accompanying drawings. The inventive concept may, however, be embodied in different forms and should not be construed as limited to the exemplary embodiments set forth herein.

Figure 1:
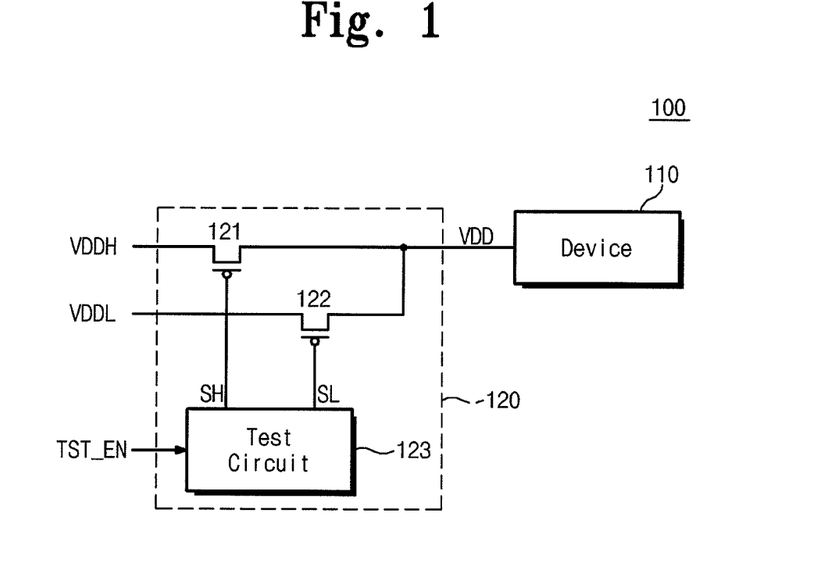
FIG. 1 is a block diagram illustrating an electronic device according to an exemplary embodiment of the inventive concept.

FIG. 1 is a block diagram illustrating an electronic device according to an exemplary embodiment of the inventive concept. Referring to FIG. 1, an electronic device 100 according to an exemplary embodiment of the inventive concept includes an internal device 110 and a tester 120. The internal device 110 may be configured with cores such as a semiconductor memory, a central processing unit (CPU), an interface circuit and a communication chip. When the internal device is the core, the electronic device 100 including the internal device 110 and the tester 120 may be organized within one chip. As another example, the internal device 110 may be a device such as a memory card, a graphic card, a personal computer, a portable phone, a Personal Digital Assistant (PDA) or a portable game machine that is an aggregate of the cores.

The tester 120 includes PMOS transistors 121 and 122, and a test circuit 123. The PMOS transistor 121 is connected between a first power supply source voltage VDDH terminal and the power supply source input terminal of the internal device 110. The PMOS transistor 122 is connected between a second power supply source voltage VDDL terminal and the power supply source input terminal of the internal device 110. The gate of the PMOS transistor 121 is controlled by a first switching signal SH from the test circuit 123, and the gate of the PMOS transistor 122 is controlled by a second switching signal SL from the test circuit 123.

The test circuit 123 outputs the first and second switching signals respectively to the PMOS transistors 121 and 122, in response to a test enable signal TST_EN input from an external source.

Figure 2:
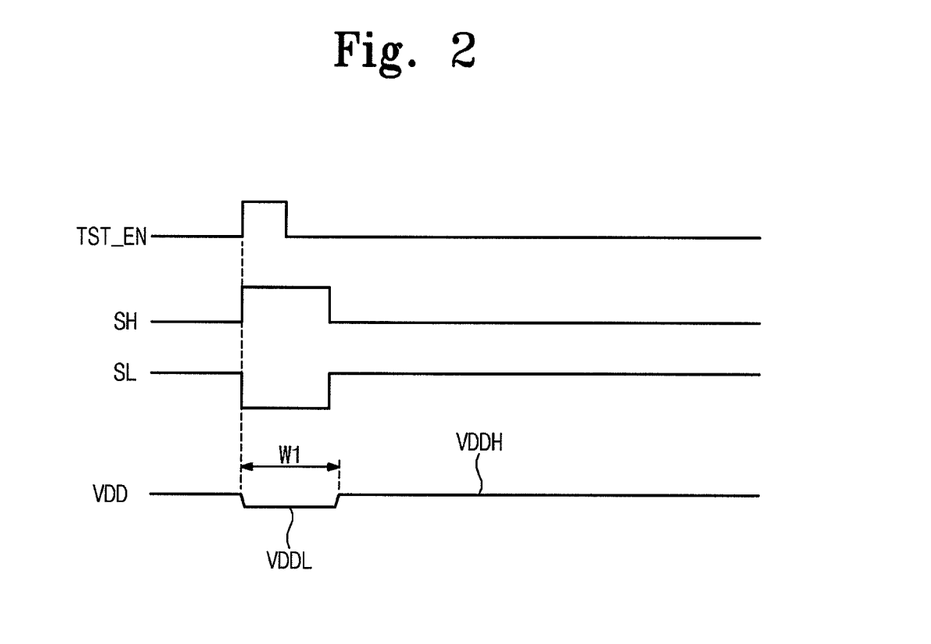
FIG. 2 is a diagram illustrating an exemplary test enable signal and an exemplary power supply source voltage, which may be inputted to the electronic device in FIG. 1.

FIG. 2 is a diagram illustrating an exemplary test enable signal and an exemplary power supply source voltage, which may be input to the electronic device in FIG. 1. Referring to FIG. 2, the test circuit 123 controls one of first and second power supply source voltages VDDH and VDDL to be supplied as the power supply source voltage VDD to the internal device 110, in response to the test enable signal TST_EN. The test enable signal TST_EN may be configured to have one various different forms. For example, the test enable signal TST_EN may be a pulse type of signal having low and high levels, a signal that maintains a high level (e.g., an active state) during a test mode, a signal that maintains a low level (e.g., an inactive state), etc.

For example, while the test enable signal TST_EN is in a normal mode where it has a low level, the test circuit 123 outputs a first switching signal SH at a low level and a second switching signal SL of a high level so that the first power supply source voltage VDDH may be supplied as the power supply source voltage VDD to the internal device 110.

For example, in a test mode when the test enable signal TST_EN is shifted (e.g. transitioned) to a high level, the test circuit 123 outputs a first switching signal SH at a high level and a second switching signal SL at a low level so that the second power supply source voltage VDDL may be supplied as the power supply source voltage VDD to the internal device 110. When a period of time (e.g., W1) elapses after the test enable signal TST_EN is shifted (e.g., transitioned) to the low level, the test circuit 123 again outputs the first switching signal SH at a low level and the second switching signal SL at the high level so that the first power supply source voltage VDDH may be supplied as the power supply source voltage VDD to the internal device 110.

The period of time W1 when the second power supply source voltage VDDL is supplied as the power supply source voltage VDD to the internal device 110 during the test mode may be controlled by adjusting the turn-on/off times of the PMOS transistors 121 and 122.

The first power supply source voltage VDDH has a voltage level in which the internal device 110 may normally operate, and the second power supply source voltage VDDL has a voltage level for testing an error operation based on the shift of the power supply source voltage of the internal device 110. In this way, by temporarily supplying an abnormal level of second power supply source voltage VDDL to the internal device 110, the electronic device 100 may test whether the internal device 110 is affected (e.g., adversely) by the shift of the power supply source voltage VDD that is supplied externally.

The voltage level of the first supply source voltage VDDH may be within a normal range of voltages required for normal operation of the internal device 110, and the voltage level of the second supply source voltage VDDL may be an abnormal voltage level outside the normal range. For example, if the normal range is 4.8 v to 5.2 v, abnormal voltages outside that range could include voltages less than 4.8 v and voltages higher than 5.2 v. However, the normal range of voltages required for normal operation of the internal device 110 is not limited to any specific range, as this is dependent on the device that is chosen as the internal device By shifting the levels of the first and second power supply source voltage VDDH and VDDL that are supplied to the internal device 110, the electronic device 100 may variously shift the level of the power supply source voltage VDD that is supplied to the internal device 110.

A timing diagram in FIG. 2 illustrates that the test circuit 123 supplies the second power supply source voltage VDDL as the power supply source voltage VDD of the internal device 110 only once in response to the test enable signal TST_EN. However, embodiments of the inventive concept may repeatedly supply the second power supply source voltage VDDL as the power supply source voltage VDD to the internal device 110 in synchronization with a periodic signal such as a clock signal. As another example, the test enable signal TST_EN may be shifted to a high level periodically or several times, enabling the electronic device 100 to input the second power supply source voltage VDDL to the internal device 110 periodically or several times.

Figure 3:
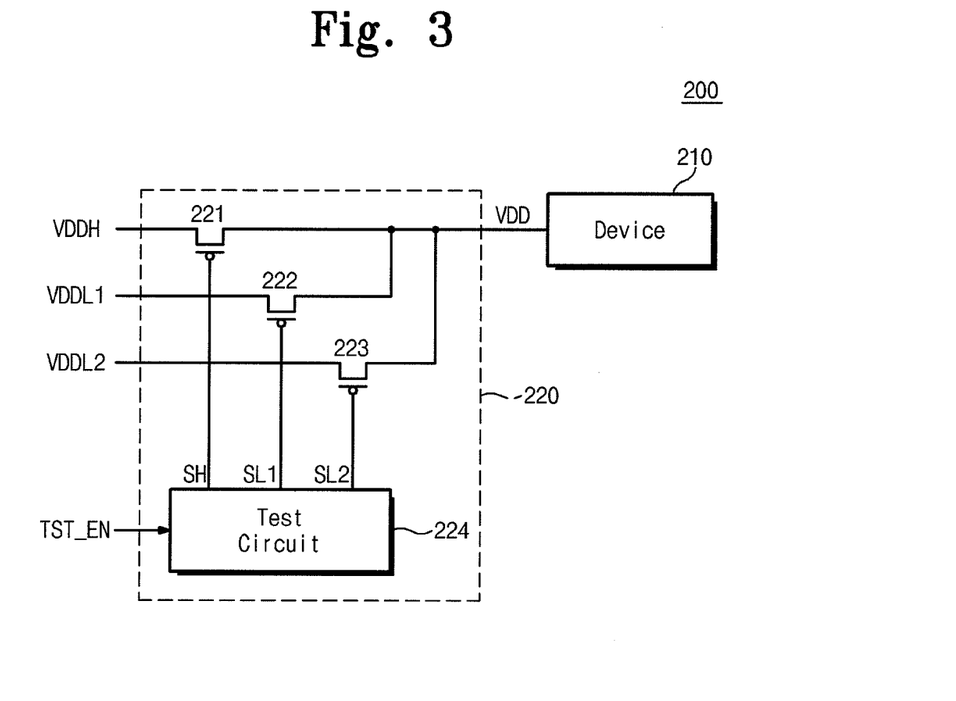
FIG. 3 is a block diagram illustrating an electronic device according to an exemplary embodiment of the inventive concept.

FIG. 3 is a block diagram illustrating an electronic device according to an exemplary embodiment of the inventive concept. Referring to FIG. 3, a tester 220 included in an electronic device 200 receives three power supply source voltages VDDH, VDDL1 and VDDL2. The tester 220 includes a PMOS transistor 221 that is connected between the power supply source voltage VDDH terminal and the power supply source voltage input terminal of an internal device 210, a PMOS transistor 222 that is connected between the power supply source voltage VDDL1 terminal and the power supply source voltage input terminal of the internal device 210, a PMOS transistor 223 that is connected between the power supply source voltage VDDL2 terminal and the power supply source voltage input terminal of the internal device 210, and a test circuit 224.

The test circuit 224 outputs first to third switching signals SH, SL1 and SL2 for respectively controlling the PMOS transistors 221, 222 and 223 in response to the test enable signal TST_EN.

Figure 4:
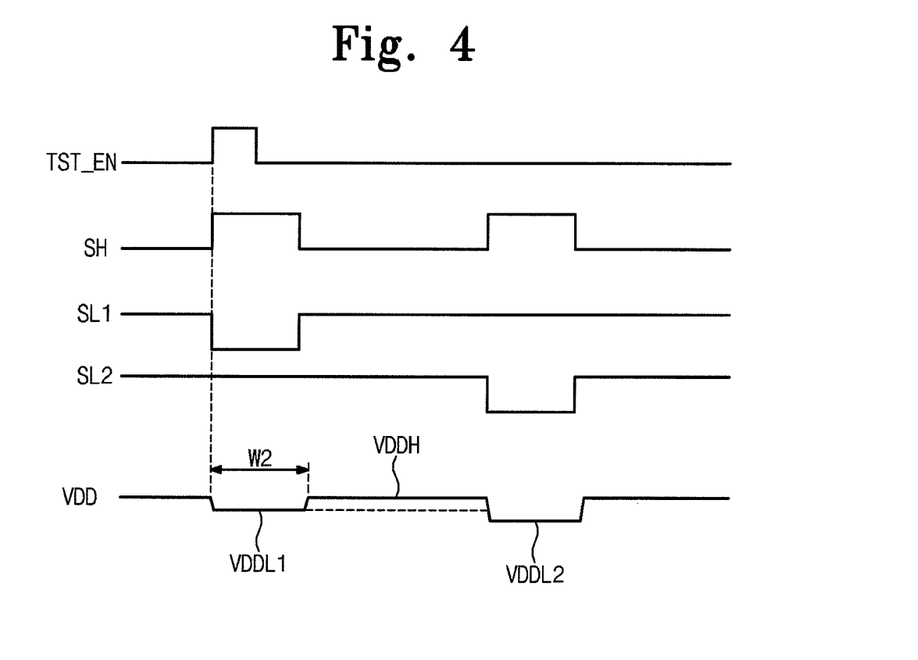
FIG. 4 is a timing diagram exemplarily illustrating the shift of a power supply source voltage, which may be supplied to the internal device in FIG. 3.

FIG. 4 is a timing diagram exemplarily illustrating the shift of the power supply source voltage VDD, which may be supplied to the internal device 210 in FIG. 3. Referring to FIG. 4, the test circuit 224 shifts the first switching signal SH to a high level and shifts the second switching signal SL1 to a low level, in response to the test enable signal TST_EN. Therefore, the second power supply source voltage VDDL1 is supplied as the power supply source voltage VDD to the internal device 210. The test circuit 224 controls the levels of the switching signal so that the second power supply source voltage VDDL 1 may be supplied as the power supply source voltage VDD to the internal device 110 during a period of time W2 and the first power supply source voltage SH may again be supplied to the internal device 110. The test circuit 224 outputs a first switching signal SH at a high level and a switching signal SL2 at a low level so that the third power supply source voltage VDDL2 may be supplied as the power supply source voltage VDD to the internal device 110 when a certain period of time elapses.

The second and third power supply source voltages VDDL1 and VDDL2 have voltage levels lower than the first power supply source voltage VDDH, and are voltage levels for testing the error operation of the internal device 210. In at least one embodiment of the inventive concept, the third power supply source voltage VDDL2 has a voltage level lower than the second power supply source voltage VDDL1.

FIG. 4 illustrates that the tester 220 sequentially supplies the second and third power supply source voltages VDDL1 and VDDL2 as the power supply source voltage VDD to the internal device 210 once in response to the test enable signal TST_EN. However, in at least one exemplary embodiment, the tester 220 may change the supplying order of the second and third power supply source voltages VDDL1 and VDDL2 and/or the second and third power supply source voltages VDDL1 and VDDL2 may be supplied as the power supply source voltage VDD to the internal device 210 several times.

Figure 5:
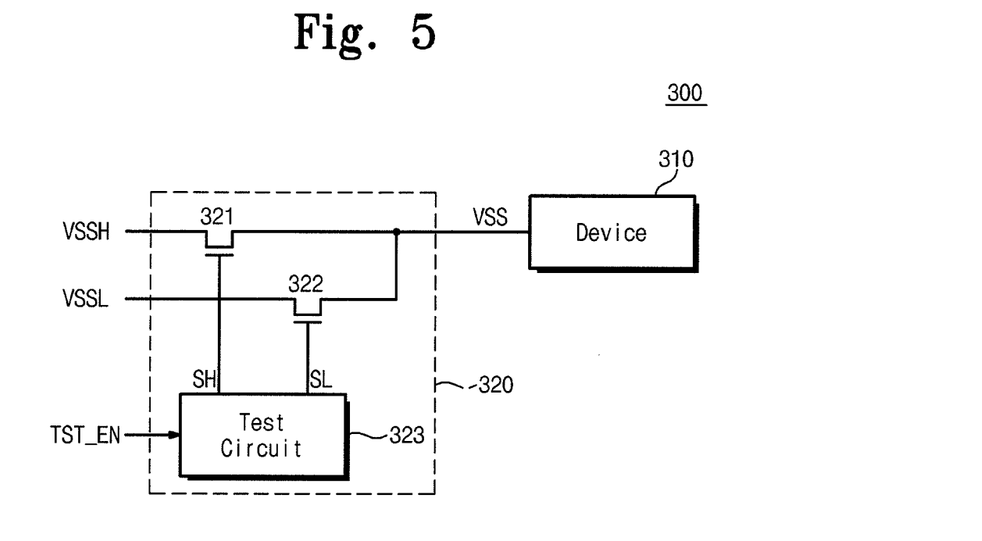
FIG. 5 is a block diagram illustrating an electronic device according to an exemplary embodiment of the inventive concept.

FIG. 5 is a block diagram illustrating an electronic device according to an exemplary embodiment of the inventive concept. Referring to FIG. 5, a tester 320 may shift a ground voltage VSS that is supplied to an internal device 310. The tester 320 receives a ground voltage VSSL of a normal level and a ground voltage VSSH of an abnormal level. The tester 320 includes NMOS transistors 321 and 322, and a test circuit 323. The NMOS transistor 321 is connected between a first ground voltage VSSH terminal and the ground voltage input terminal of the internal device 310, and is controlled by a first switching signal SH from the test circuit 323. The NMOS transistor 322 is connected between a second ground voltage VSSL terminal and the ground voltage input terminal of the internal device 310, and is controlled by a second switching signal SL from the test circuit 323.

Figure 6:
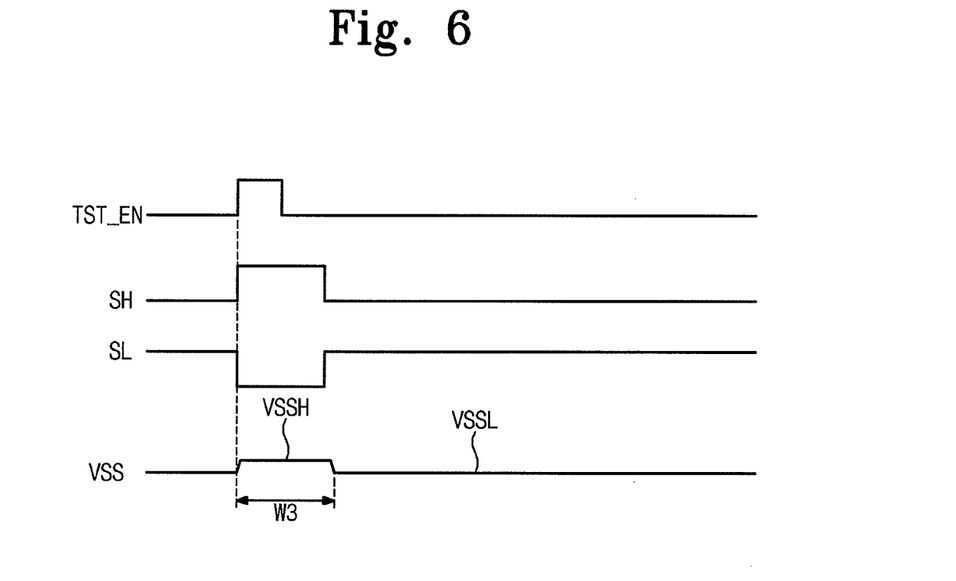
FIG. 6 is a diagram illustrating an exemplary shift of a ground voltage, which may be supplied to the internal device of the electronic device in FIG. 5.

FIG. 6 is a diagram illustrating the shift of the ground voltage, which may be supplied to the internal device 310 of the electronic device in FIG. 5. Referring to FIG. 6, the test circuit 323 outputs a first switching signal SH at a high level and a second switching signal SL at a low level in response to a test enable signal TST_EN. Therefore, the internal device 310 temporarily receives a the ground voltage VSSH of an abnormal level as the ground voltage VSSH during a time W3. In this way, by temporarily supplying the ground voltage VSSH of the abnormal level to the internal device 310, the electronic device 100 may test whether the internal device 310 is affected (e.g., adversely) by the shift of the ground voltage VSS that is supplied externally.

Figure 7:
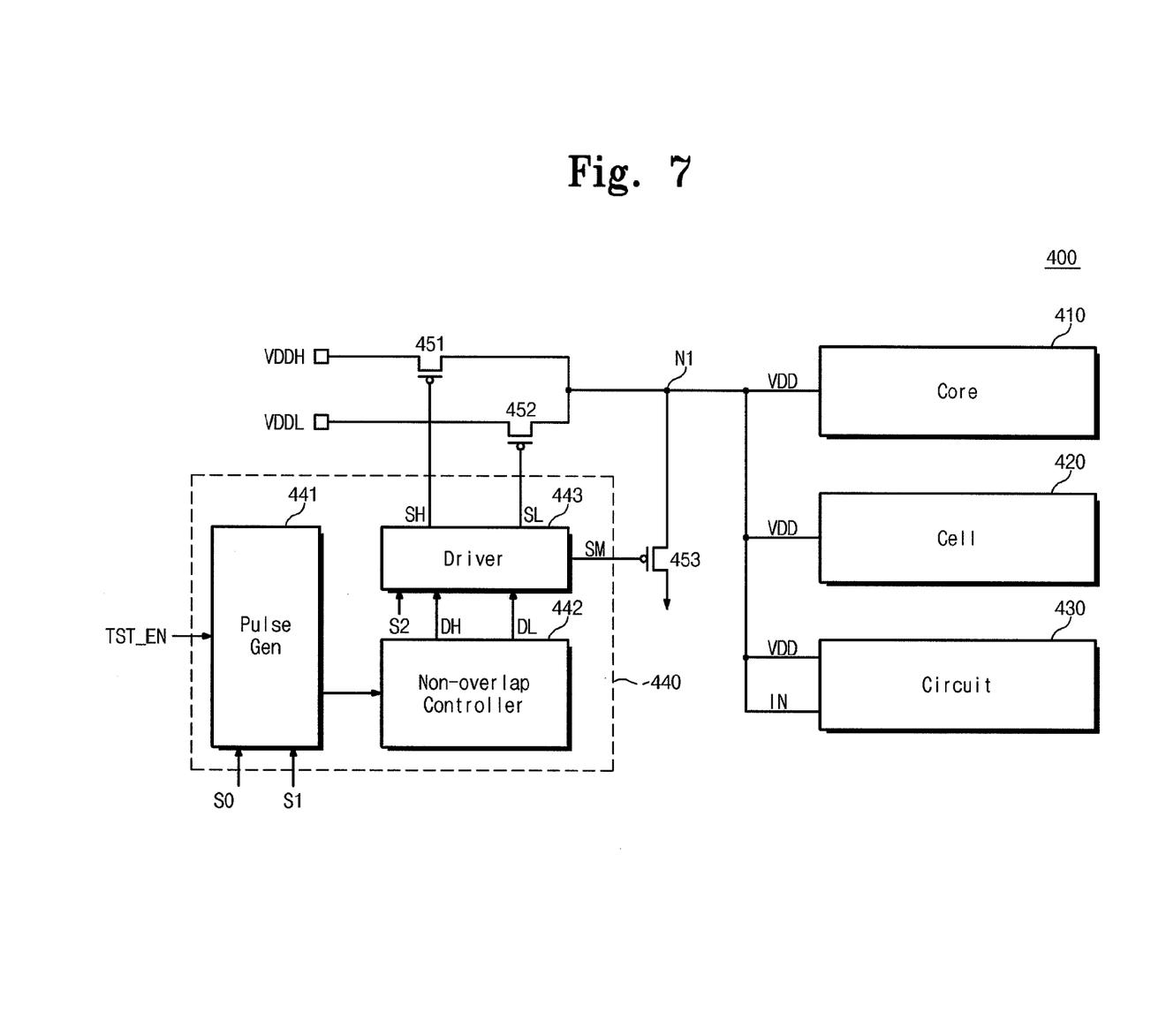
FIG. 7 is a block diagram illustrating an electronic device according to an exemplary embodiment of the inventive concept.

FIG. 7 is a block diagram illustrating an electronic device according to an exemplary embodiment of the inventive concept. Referring to FIG. 7, an electronic device 400 includes a core 410, a cell 420 and a circuit 430, which receive a power supply source voltage VDD to operate. The core 410 may be a semiconductor chip such as a processor, a digital signal processor (DSP) or a semiconductor memory. The cell 420 may be any one of logic gates such as an inverter, a NAND gate, a NOR gate, or a multiplexer. The circuit 430 may be the combination of a plurality of logic gates or various electrical circuits.

The electronic device 400 may shift a power supply source voltage that is supplied to the core 410, the cell 420 and the circuit 430, and may shift the level of an input signal IN that is inputted to the core 410, the cell 420 and the circuit 430, thereby enabling a test. For example, when shifting the input signal IN inputted to the circuit 430 from a first power supply source voltage VDDH to a second power supply source voltage VDDL, the electronic device 400 is enabled to monitor the operation state of the circuit 430 based on the level shift of the input signal IN.

The electronic device 400 includes PMOS transistors 451, 452 and 453 that may supply a test power supply source voltage to the core 410, the cell 420 and the circuit 430, and a test circuit 440. The PMOS transistor 451 is connected between the first power supply source voltage VDDH and a node N1, and is controlled by a first switching signal SH. The PMOS transistor 452 is connected between the second power supply source voltage VDDL and the node N1, and is controlled by a second switching signal SL. The PMOS transistor 453 is connected between the node N1 and a ground voltage, and is controlled by a third switching signal SM.

The core 410, the cell 420 and the circuit 430 receive the first power supply source voltage VDDH or the second power supply source voltage VDDL, which is applied through the node N1, as the power supply source voltage VDD. The circuit 430 receives the voltage signal of the node N1 as the input signal IN.

The test circuit 440 may include a pulse generator 441, a non-overlap controller 442 and a driver 443. The pulse generator 441 generates a pulse signal in response to a test enable signal TST_EN and selection signals S0 and S1. The non-overlap controller 442 outputs a pair of complementary signals DH and DL in response to the pulse signal from the pulse generator 441. The driver 443 outputs the first to third switching signals SH, SL and SM for controlling the gates of the PMOS transistors 451, 452 and 453 in response to the pair of complementary signals DH and DL from the non-overlap controller 442.

Figure 8:
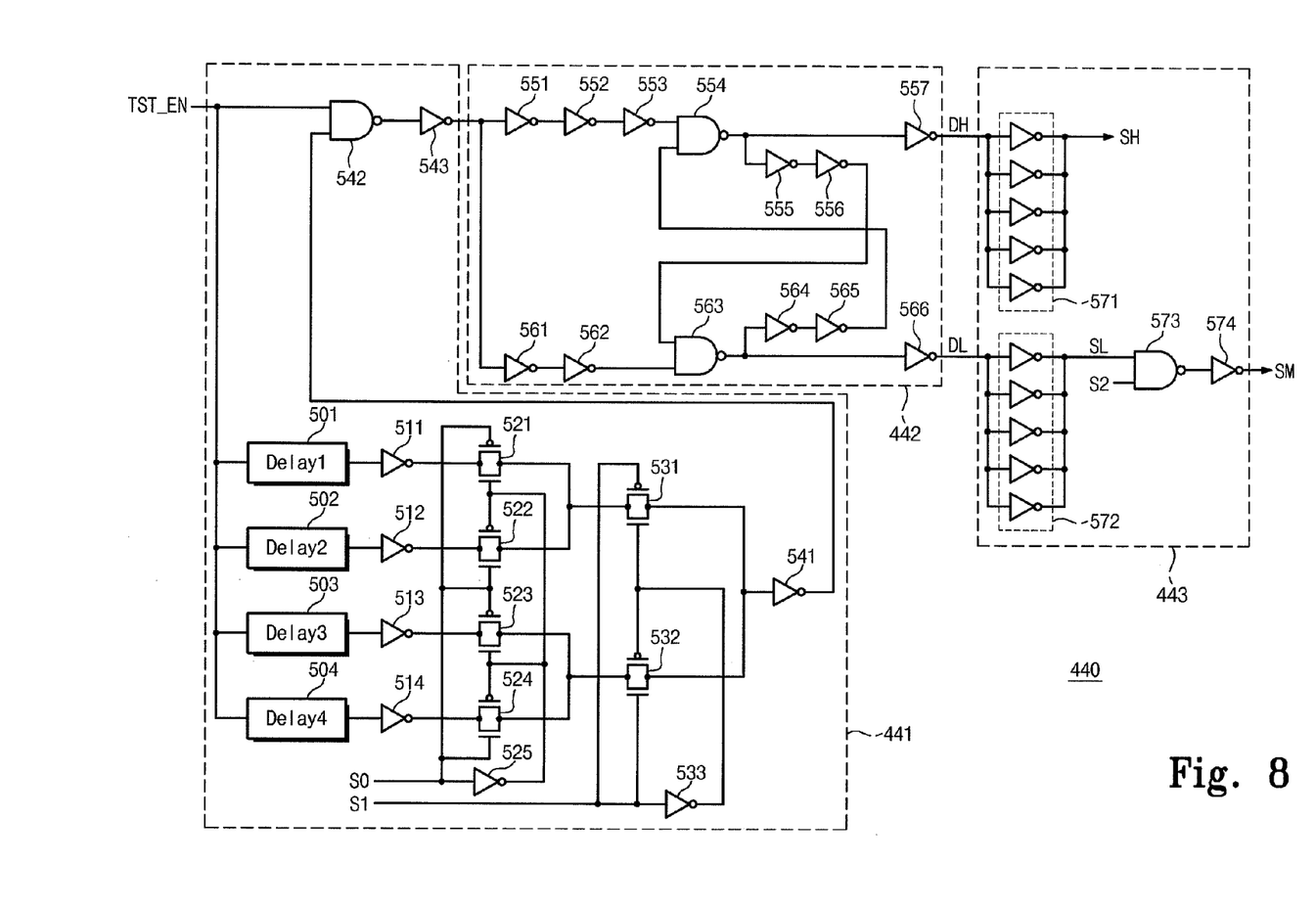
FIG. 8 is a circuit diagram illustrating a test circuit in FIG. 7 according to an exemplary embodiment of the inventive concept.

FIG. 8 is a circuit diagram illustrating the test circuit 440 in FIG. 7 according to an exemplary embodiment of the inventive concept. Referring to FIG. 8, the pulse generator 441 includes delays 501 to 504, inverters 511 to 514, 525, 533, 541 and 545, transmission gates 521 to 524, 531 and 532, and a NAND gate 542. While FIG. 8 shows delays, with corresponding inverters, and transmission gates numbering four, the number may larger or smaller.

The delays 501 to 504 receive the test enable signal TST_EN and have different delay times. The inverters 511 to 514 respectively correspond to the delays 501 to 504 and invert the output of a corresponding delay. The transmission gates 521 to 524 respectively correspond to the inverters 511 to 514, and transfer a signal, which is inputted from a corresponding inverter, as an output in response to a selection signal S0 and a selection signal that is inverted by the inverter 525. The transmission gate 531 transfers a signal, which is outputted from one of the transmission gates 521 and 522, to the inverter 541 in response to a selection signal S1 and a selection signal that is inverted by the inverter 533. The transmission gate 532 transfers a signal, which is outputted from one of the transmission gates 523 and 524, to the inverter 541 in response to the selection signal S1 and the selection signal that is inverted by the inverter 533. The inverter 541 inverts the output of one of the transmission gates 531 and 532 to output the inverted output to the NAND gate 542. The NAND gate 542 receives the test enable signal TST_EN and the output of the inverter 541. The inverter 542 inverts the output of the NAND gate 542 to output a pulse signal.

The pulse generator 441 having the above-described configuration outputs the pulse signal according to the selection signals S0 and S1 after the test enable signal TST_EN is shifted to a high level and thereafter a time corresponding to the delay time of any one of the delays 501 to 504 elapses.

The non-overlap controller 442 includes inverters 551 to 553, 555 to 557, 561, 562 and 564 to 566, and NAND gates 554 and 563. The inverters 551 to 553 are sequentially connected in series, and receive the pulse signal that is outputted from the pulse generator 441. The inverters 551 to 553 may correspond to an odd number of inverters and while FIG. 8 shows the inverters 551 to 553 numbering three, the number may be higher or lower. The NAND gate 554 receives the output of the inverter 533 and the output of the inverter 565. The inverter 557 inverts the output of the NAND gate 554 to output a signal DH. The output of the NAND gate 554 sequentially passes through the inverters 555 and 556 and is inputted to the NAND gate 563. The inverters 561 and 562 are sequentially connected in series, and receive the pulse signal that is outputted from the pulse generator 441. The inverters 561 and 562 may correspond to an even number of inverters and while FIG. 8 shows the inverters numbering two, the number may be higher or lower. The NAND gate 563 receives the output of the inverter 562 and the output of the inverter 556. The inverter 566 inverts the output of the NAND gate 563 to output a signal DL. The output of the NAND gate 563 sequentially passes through the inverters 564 and 565 and is inputted to the NAND gate 554.

The pulse signal from the pulse generator 441 is outputted as a pair of complementary signals DH and DL through two signal paths in the non-overlap circuit 442. The non-overlap circuit 442 controls the pair of complementary signals DH and DL so they are not shifted to low levels at the same time, thus preventing the PMOS transistors 451 and 452 from being turned on at the same time.

The driver 443 includes inverter arrays 571 and 572, a NAND gate 573, and an inverter 574. The inverter array 571 includes a plurality of inverters that are connected in parallel between the output terminal of the inverter 557 for outputting the first switching signal DH and the gate of the PMOS transistor 451 for receiving the signal SH. The inverter array 572 includes a plurality of inverters that are connected in parallel between the output terminal of the inverter 566 for outputting the signal DL and the gate of the PMOS transistor 452 for receiving the second switching signal SL. The inverter arrays 571 and 572 output currents suitable for the driving of the PMOS transistors 451 and 452. While FIG. 8 illustrates five inverters in each of the inverter arrays 571 and 572, the number of inverters included in each of the inverter arrays 571 and 572 may be changed to include a smaller or greater number of inverters.

The NAND gate 573 receives the second switching signal SL and the selection signal S2. The inverter 574 receives the output of the NAND gate 573 to output the third switching signal SM. The selection signal S2 may be used for controlling the drop slope of the power supply source voltage VDD when the power supply source voltage VDD is shifted from the first power supply source voltage VDDH to the second power supply source voltage VDDL.

According to at least one exemplary embodiment of the inventive concept, a power supply source tester can shift an external power supply source voltage to an abnormal level to supply the shifted voltage to an internal device. The tester can test the operation state of the internal device at various abnormal voltage levels. Moreover, an electronic device according to at least one exemplary embodiment of the inventive concept can shift a power supply source voltage and input signals, which are inputted to an internal device, into abnormal signal levels to test the operation state of the internal device.

While exemplary embodiments of the inventive concept have been described, it is understood that the inventive concept is not limited to these exemplary embodiments, but various changes and modifications can be made by one ordinary skilled in the art within the spirit and scope of the disclosure.

What is claimed is:

1. An electronic device, comprising:
   an internal device comprising a power supply source input terminal; and
   a voltage tester supplying a first power supply source voltage to the power supply source input terminal of the internal device in response to a first switching signal, and a second power supply source voltage to the power supply source input terminal of the internal device in response to a second switching signal,
   wherein the first and second power supply source voltages have different voltage levels, and the first and second power supply voltages have constant values respectively,
   wherein the first and second switching signals are supplied in response to a test signal, and
   wherein values of the first and second switching signals are different from each other.

2. The electronic device of claim 1, wherein the voltage tester comprises:
   a first switch connected between the first power supply source voltage and the power supply source input terminal;
   a second switch connected between the second power supply source voltage and the power supply source input terminal; and
   a test circuit outputting the first and second switching signals for respectively controlling the first and second switches.

3. The electronic device of claim 2, wherein the first and second switches are PMOS transistors.

4. The electronic device of claim 2, wherein the voltage tester comprises:
   a pulse generator generating a pulse signal in response to the test signal; and
   a driver receiving the pulse signal to output the first and second switching signals.

5. The electronic device of claim 4, wherein the driver generates the first and second switching signals to be complimentary to one another.

6. The electronic device of claim 4, wherein:
   the electronic device further comprises an NMOS transistor connected between the power supply source input terminal and a ground voltage terminal, and
   the driver further outputs a third switching signal for controlling the NMOS transistor in response to the second switching signal.

7. The electronic device of claim 4, wherein the pulse generator comprises:
   a plurality of delays delaying and outputting the test signal, and having different delay times; and
   a selection circuit generating the pulse signal in response to any one of the delayed test signals which are outputted from the delays, in response to a plurality of selection signals.

8. The electronic device of claim 2,
   wherein the voltage tester transitions the first switching signal from a low level to a high level and the second switching signal from a high level to a low level when the test signal transitions from a low level to a high level, and
   wherein the voltage tester maintains the first switching signal at the high level and the second switching signal at the low level for a period of time after the test signal transitions from the high level to the low level.

9. The electronic device of claim 1, wherein:
   the power supply source input terminal is a ground voltage input terminal, and
   the first and second switches are NMOS transistors.

10. The electronic device of claim 1, wherein the first power supply source voltage has a voltage level higher than the second power supply source voltage.

11. A central processing unit, comprising:
    an internal device comprising a signal input terminal; and
    a tester supplying a first voltage to the signal input terminal in response to a first switching signal, a second voltage to the signal input terminal in response to a second switching signal, and a third voltage to the signal input terminal in response to a third switching signal,
    wherein the first, second, and third voltages have different voltage levels,
    wherein the first, the second, and the third voltages have constant values respectively,
    wherein the first switching signal, the second switching signal, and the third switching signal are supplied in response to a test signal,
    wherein values of the first switching signal and the second switching signal are different from each other, and
    wherein the internal device and the tester are disposed on a single chip.

12. The electronic device of claim 11, wherein the first voltage is higher than the second and third voltages, and the second voltage is higher than the third voltage.

13. The electronic device of claim 11, wherein the tester comprises:
- a first switch connected between the first voltage and the signal input terminal;
- a second switch connected between the second voltage and the signal input terminal;
- a third switch connected between the third voltage and the signal input terminal; and
- a test circuit outputting the first, second, and third switching signals for respectively controlling the first, second, and third switches, in response to the test signal.

14. The electronic device of claim 13,
- wherein the test circuit transitions the first switching signal from a low level to a high level and the second switching signal from a high level to a low level when the test signal transitions from a low level to a high level,
- wherein the test circuit transitions the first switching signal from the high level to the low high level and the second switching signal from the low level to the high level after a first period of time elapses,
- wherein the test circuit transitions the first switching signal from the low level to the high level, the third switching signal from the high level to the low level after a second period of time subsequent to the first period elapses.

15. An electronic device, comprising:
- an internal device comprising a signal input terminal;
- a voltage tester supplying a first voltage to the signal input terminal in response to a first switching signal, a second voltage to the signal input terminal in response to a second switching signal, and a ground voltage to the signal input terminal in response to a third switching signal;
- a first switch connected between the first power supply voltage and the signal input terminal;
- a second switch connected between the second power supply voltage and the signal input terminal; and
- a third switch connected between the ground voltage and the signal input terminal,
- wherein the first and second power supply voltages have different voltage levels that are higher than the ground voltage,
- wherein the first and second voltages have constant values respectively,
- wherein the first, second, and third switching signals are supplied in response to a test signal, and
- wherein values of the first and second switching signals are different from each other.

16. The electronic device of claim 15, wherein the voltage tester comprises:
- a pulse generator generating a pulse based on the test signal, a first selection signal, and a second selection signal;
- a non-overlap controller outputting a pair of complementary signals based on the test signal and the pulse; and
- a driver outputting the first, second, and third switching signals to control the first, second, and third switches, respectively, based on the complementary signals and a third selection signal.

17. The electronic device of claim 16, wherein the pulse generator comprises:
- a plurality of delays each receiving the test signal and delaying the test signal for a different amount of time;
- a plurality of inverters each receiving an output of a distinct one of the delays;
- a plurality of first transmission gates receiving an output of a distinct one of the inverters; and
- a plurality of second transmission gates,
- wherein non-complimentary gate terminals of a first half of the first transmission gates and complimentary gate terminals of the second other half receive the first selection signal, and non-complimentary gate terminals signals of the first half and complimentary gate terminals of the second half receive the first selection signal inverted,
- wherein each second transmission gate receives outputs from a distinct pair of the first transmission gates, each of the gates being from a different one of the halves, and
- wherein a non-complimentary gate terminal of a second transmission gate and a complimentary gate terminal of an other second transmission gate receive the second selection signal and a complimentary gate terminal of the second transmission gate and a non-complimentary gate terminal of the other second transmission gate signal receives the second selection signal inverted.

18. The electronic device of claim 16, wherein the non-overlap controller comprises:
- an odd number of first inverters in series, a first one of the first inverters receiving the pulse;
- an even number of second inverters in series, a first one of the second inverters receiving the pulse;
- a first NAND gate receiving an output of a last inverter of the first inverters;
- a second NAND gate receiving an output of a last inverter of the second inverters;
- a plurality of third inverters in series, a first one of the third inverters receiving an output of the first NAND gate, the first NAND gate receiving an output of a last one of the third inverters; and
- a plurality of fourth inverters in series, a first one of the fourth inverters receiving an output of the second NAND gate, the second NAND gate receiving an output of a last one of the fourth inverters.

19. The electronic device of claim 16, wherein the driver comprises:
- a plurality of first inverters in parallel receiving a first one of the complementary signals, the first inverters outputting the first switching signal;
- a plurality of second inverters in parallel receiving a second other one of the complementary signals, the second inverters outputting the second switching signal;
- a NAND gate including a first input line and a second other input line, the first input line receiving outputs from the second inverters, and the second input line receiving the third selection signal; and
- an additional inverter receiving an output of the NAND gate and outputting the third switching signal.

* * * * *